US009100197B2

(12) United States Patent
Locker et al.

(10) Patent No.: US 9,100,197 B2
(45) Date of Patent: Aug. 4, 2015

(54) APPARATUS AND METHOD FOR SIGNALING BY AND TO A COMPUTER SYSTEM USER

(75) Inventors: Howard J. Locker, Cary, NC (US); Richard W. Cheston, Morrisville, NC (US); Daryl C. Cromer, Cary, NC (US); Deepak Advani, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2639 days.

(21) Appl. No.: 11/334,921

(22) Filed: Jan. 19, 2006

(65) Prior Publication Data

US 2007/0168497 A1   Jul. 19, 2007

(51) Int. Cl.
*G06F 15/177* (2006.01)
*G06F 15/173* (2006.01)
*H04L 12/12* (2006.01)

(52) U.S. Cl.
CPC *H04L 12/12* (2013.01); *Y02B 60/34* (2013.01)

(58) Field of Classification Search
USPC .................................................. 709/217, 220
See application file for complete search history.

(56) References Cited

U.S. PATENT DOCUMENTS

| | | | | |
|---|---|---|---|---|
| 5,905,493 A * | 5/1999 | Belzer et al. | ................... | 715/835 |
| 5,925,131 A * | 7/1999 | Novoa et al. | ................... | 713/300 |
| 6,167,567 A | 12/2000 | Chiles et al. | .................... | 717/11 |
| 6,292,835 B1 | 9/2001 | Huang et al. | ................... | 709/235 |
| 6,353,926 B1 | 3/2002 | Parthesarathy et al. | ......... | 717/11 |
| 6,415,392 B1 * | 7/2002 | Suzuki et al. | ................... | 714/27 |
| 6,763,403 B2 | 7/2004 | Cheng et al. | ..................... | 710/36 |
| 6,880,086 B2 | 4/2005 | Kidder et al. | ................. | 713/191 |
| 7,043,522 B2 * | 5/2006 | Olson et al. | ................... | 709/202 |
| 7,702,777 B2 * | 4/2010 | Cromer et al. | ................ | 709/224 |
| 2002/0066010 A1 | 5/2002 | Bourke-Dunphy et al. | .. | 713/100 |
| 2002/0116266 A1 * | 8/2002 | Marshall | ......................... | 705/14 |
| 2003/0005452 A1 * | 1/2003 | Rodriguez | ....................... | 725/86 |
| 2003/0033382 A1 * | 2/2003 | Bogolea et al. | ............... | 709/218 |
| 2003/0046132 A1 | 3/2003 | Keeley | ................................ | 705/8 |
| 2003/0093476 A1 | 5/2003 | Syed | .............................. | 709/204 |
| 2003/0212992 A1 | 11/2003 | Ronning et al. | .............. | 717/178 |
| 2003/0225843 A1 * | 12/2003 | Sakata | .......................... | 709/206 |
| 2004/0098421 A1 | 5/2004 | Peng | .............................. | 707/203 |
| 2004/0103411 A1 | 5/2004 | Thayer | .......................... | 717/171 |
| 2004/0158610 A1 * | 8/2004 | Davis et al. | .................... | 709/206 |
| 2004/0201668 A1 * | 10/2004 | Matsubara et al. | ........ | 348/14.05 |
| 2004/0243996 A1 | 12/2004 | Shechy et al. | ................. | 717/174 |
| 2004/0266491 A1 | 12/2004 | Howard et al. | ............... | 455/567 |
| 2005/0138427 A1 | 6/2005 | Cromer et al. | ................ | 713/201 |
| 2007/0139183 A1 * | 6/2007 | Kates | ............................ | 340/521 |

* cited by examiner

*Primary Examiner* — Gerald Smarth

(74) *Attorney, Agent, or Firm* — Patrick J. Daugherty; Driggs, Hogg, Daugherty & Del Zoppo Co., LPA

(57) ABSTRACT

Apparatus, methods and program products by which the user of a computer system is notified of the desirability or urgency of initiating an interval during which the user leaves the system idle to permit some communication or update from a network with which the system is in communication.

21 Claims, 6 Drawing Sheets

APPARATUS AND METHOD FOR SIGNALING BY AND TO A COMPUTER SYSTEM USER

FIELD AND BACKGROUND OF INVENTION

This invention is directed to apparatus, methods and program products by which the user of a computer system is notified of the desirability or urgency of initiating an interval during which the user leaves the system idle. It is contemplated that the reason for allowing the system to go idle from activation by the user is to permit some communication or update from a network with which the system is in communication.

SUMMARY OF THE INVENTION

It has been proposed before that maintenance tasks for a user's system, such as virus definition downloads, virus scanning, backup, disk defragmentation, database compaction, installation of software updates or operating system security patches and the like, be done during periods of system inactivity. Heretofore, the timing of such tasks has been dependent on predicting intervals of non-use of a system by the assigned user. Such prediction is a difficult task at best, as an individual user may or may not have predictable patterns of system use. If a system administrator could always depend upon client system users being inactive during a fixed meal interval, such as a lunchtime of noon to 1:00 PM, then the task would be simplified. However, such is not always the case due to varying work habits, schedules and demands. It has been proposed in co-pending application Ser. No. 11/061,481, filed Feb. 22, 2005 that an algorithm be employed to monitor a user client system on an ongoing basis to assist in such prediction.

Notwithstanding the successful implementation of such technology, circumstances will arise, such as during a particularly fast moving and virulent virus attack, when it is desirable for a system administrator or other manager to signal to users that it is desirable that a period of non-use or inactivity be initiated. Such a signal may be used with varying levels of importance or criticality. For example, the aforementioned danger of a virus attack may be highly critical. A software update may be desirable, but of lower criticality. Even lower might be a management notice of some event such as an all hands meeting or rest and relaxation gathering such as a company outing or picnic.

With the foregoing in mind, it is one purpose of this invention to provide a user of a client system with a way to indicate that a period of non-use has been initiated and a system administrator or other manager with a way to signal to a client system user that it is desirable that such a period be initiated. This invention contemplates that such a capability for the user is provided by an "away" button which may be activated by the user to indicate to a network that a period of non-use or inactivity has been started. This invention contemplates that such a capability for the administrator or manager is provided for the administrator or manager by having the away button be responsive to a network communication indicating the desirability of the user initiating a period of non-use or inactivity.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The present invention may be implemented in a computer system, in a method of operating a computer system, and in the form of a program product distributed for use in a computer system.

Figure 1:
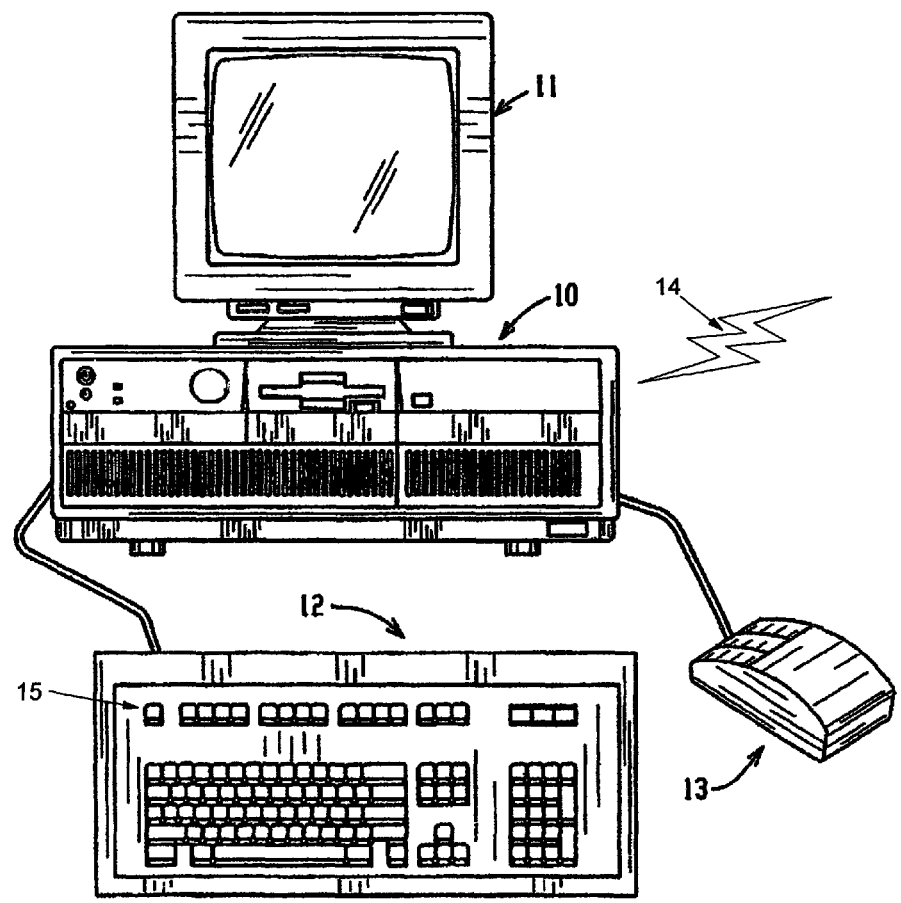
FIG. 1 is an illustration of a deskside computer system in which the present invention is implemented.

Turning first to implementation in a computer system, FIG. 1 illustrates a typical computer workstation, here a personal computer system 10. The system includes a central processor, memory accessible to the processor for storing data including programs to be executed, a display 11, input devices including a keyboard 12 and a pointing device (here shown as a mouse 13), and output devices including a network interface, often known as a NIC. The NIC may implement network connectivity by a wired connection such as an Ethernet connection or by a wireless connection (indicated at 14 in FIG. 1) such as one of the IEEE 802.11 protocols. Such computer systems come in a variety of configurations, some known as notebook systems, others as desktop or deskside systems, some known as servers, and some known as "thin clients". The same technology appears in what are known as handheld computer systems (some of which are also known as PDAs or Personal Digital Assistants) and in certain telephone instruments such as cellular or smart telephones. The present invention finds usefulness with any such systems, and it is to be understood that the choice of one type of such system for illustration is in no way limiting upon the implementation of this invention. Persons familiar with the arts of computer technology will easily recognize the scope of applicability of what is here described and illustrated.

In one embodiment of the present invention, the away button is an electro mechanical device taking the form of a key 15 on the system keyboard 12 or a button on the front bezel of the display 11 (not shown in FIG. 1). In such a form, the user may press the away button to signal through the network interface the initiation and termination of an interval of non-use of the system by the user. Such a signal may be received by a system administrator or manager to provide certainty that the client system is inactive and that maintenance, download of software or messages or signaling may be accomplished.

Conversely, the system administrator or manager may selectively activate the away button by a network communication to signal to a user the desirability of initiating an interval of non-use of the system. Where the away button is implemented in hardware, the key 15 may be lighted by a light emitting diode or similar device which responds to the signaling network communication passed through the network interface by changing state. Such a change in state may be simply a change from non-illumination to illumination or may be more complex, as by flashing at a controlled rate or, where variously colored devices are employed, by a change in color. Where this capability is provided, the administrator or manager may signal the degree of urgency attached to the desirability of initiating non-use. That is, if there is a critical need such as the immediate need for a security update or virus definition change, one color such as red or one flashing rate such as a fast flash may be directed. Where the need is less urgent, such as a m normal maintenance activity or update, perhaps a blue color or a medium flash rate. Where the need is significantly less urgent, perhaps a green color or a slow flash rate.

As will be understood, the administrator or manager may designate the significance to be attached to the network communication, with the user being instructed in the appropriate response to the signals which arrive. The greater the degree of urgency, the quicker the user should respond by selective activation of the away button to signal through the network interface the initiation of an interval of non-use of the system.

Figure 2:
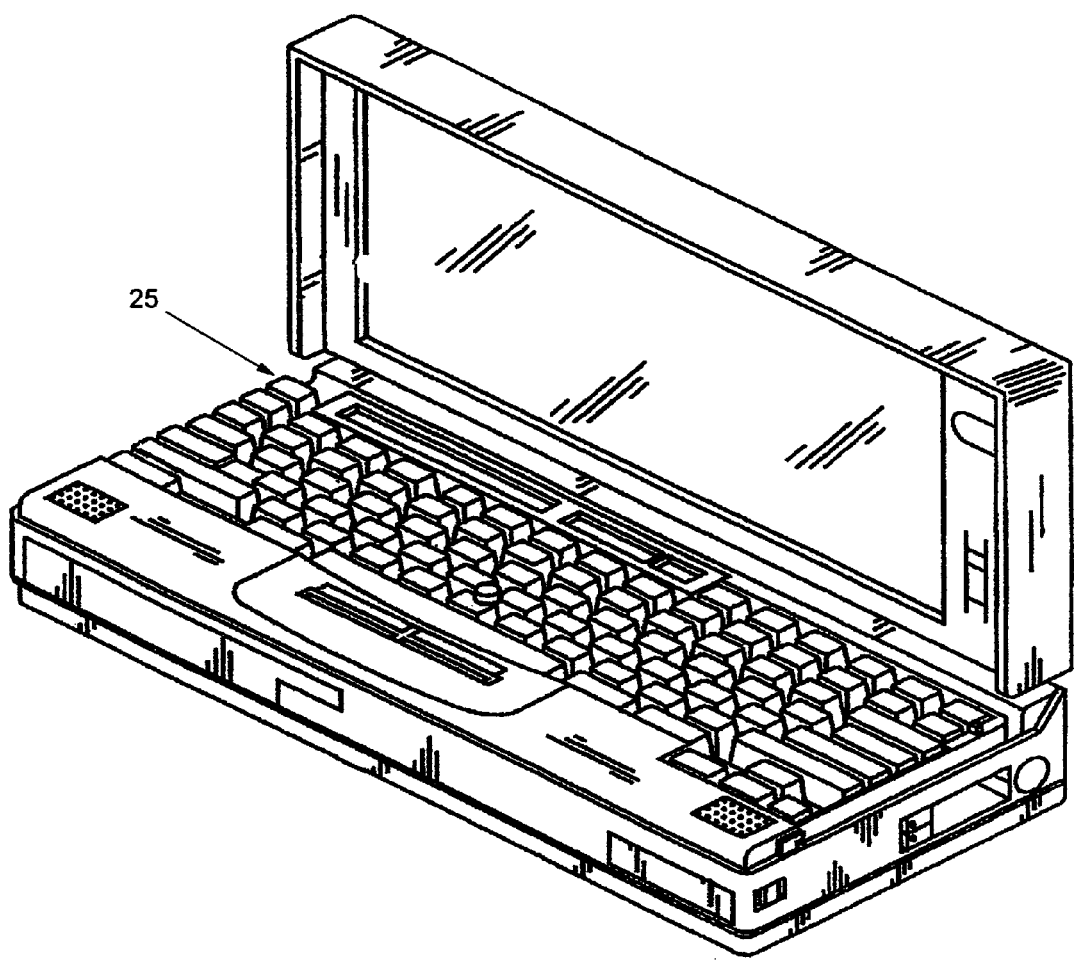
FIG. 2 is an illustration of a notebook computer system in which the present invention is implemented.
Figure 3:
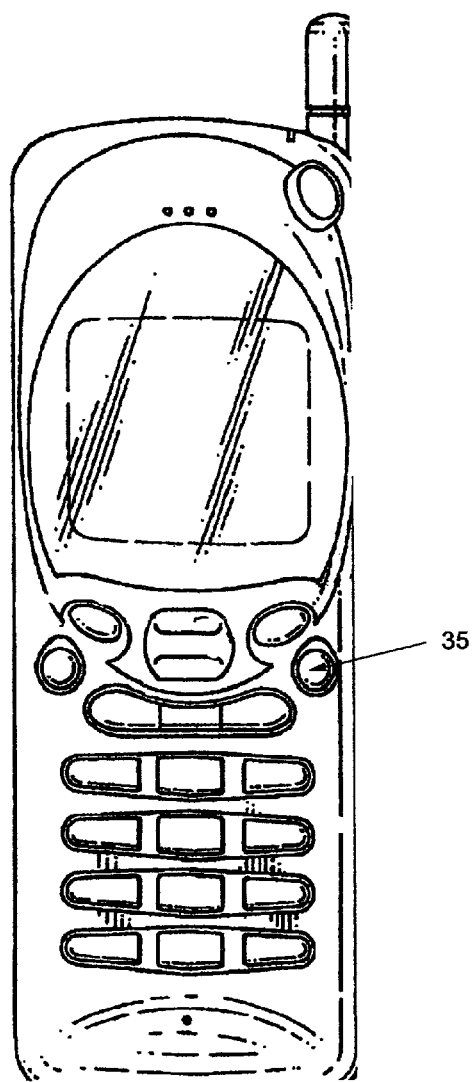
FIG. 3 is an illustration of a handheld computer system in which the present invention is implemented.
Figure 4:
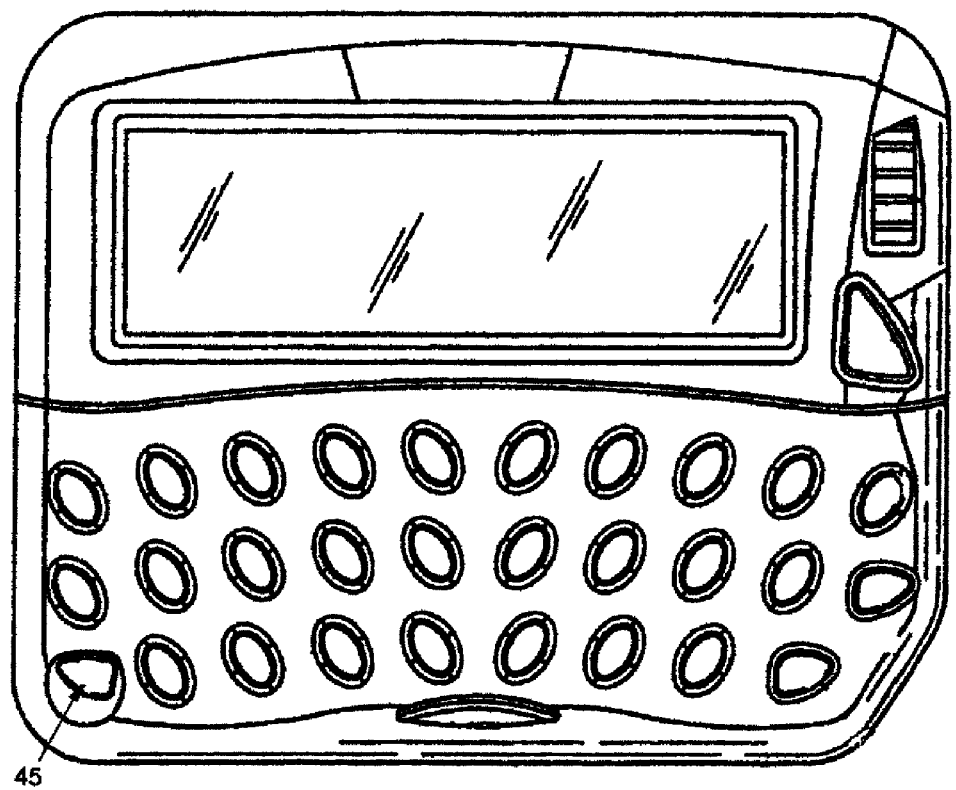
FIG. 4 is an illustration of a telephone instrument in which the present invention is implemented.

FIGS. 2, 3 and 4 illustrate implementations comparable to that described to this point in a notebook system, a handheld system, and a cell phone, respectively. In each view, an away button is shown at 25, 35 and 45, respectively.

Figure 5:
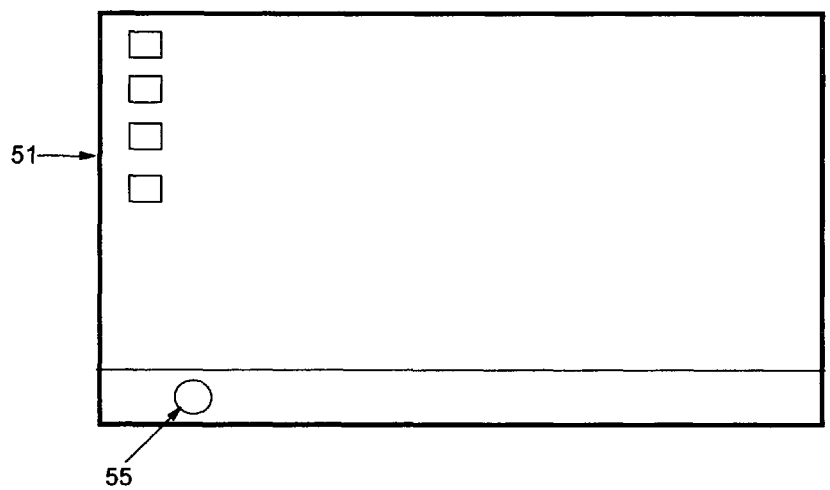
FIG. 5 is an illustration of a display generated by any one of the system of FIGS. 1 through 4 in accordance with an alternate implementation of this invention.

FIG. 5 shows a display such as may be generated by any of the systems of FIGS. 1 through 5. Here, the away button is implemented by software which drives the display of an element 55 displayed visibly to a user on the display 51. The away button may be selectively activated by the user by using a pointing device to move a cursor over the element 55 or, where a touch screen is employed as the display, by touching the button element with a stylus or finger.

With the display implementation, signaling from the administrator or manager may cause a change in state of the away button similar to that provided for a key and as described above. That is, the element 55 may flash or change color, with varying flash rates and/or colors indicating to the user the urgency of the need to initiate an interval of non-use.

Figure 6:
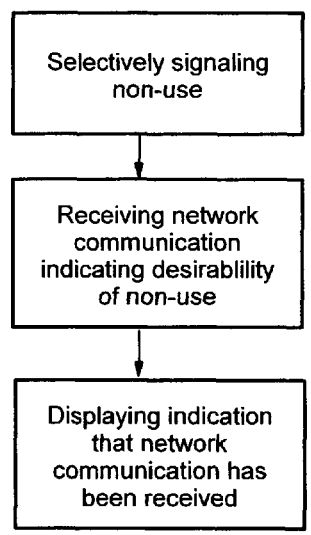
FIG. 6 is a flow chart illustrating the steps in implementation of the invention in the apparatus of FIGS. 1 through 5.

The sequence of operation of any of the various implementations described is illustrated by a flow chart in FIG. 6. There the steps of a method in accordance with this invention are shown. The method steps include selectively signaling from a computer system the initiation and termination of an interval of non-use of the system by a user; receiving at the computer system a selectively sent network communication indicating to a user the desirability of initiating an interval of non-use of the system; and displaying to a user an indication that a network communication indicating the desirability of initiating an interval of non-use of the system has been received. The steps may be further characterized as described above to implement signals using hardware or displayed elements; signaling the degree of urgency by changing state; and the like.

Figure 7:
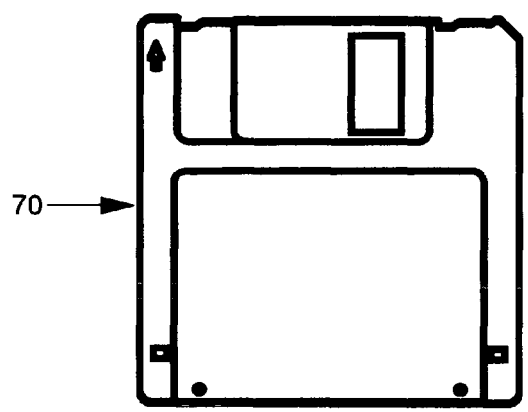
FIG. 7 is an illustration of a computer readable medium bearing program code which, when executing on one of the systems of FIGS. 1 through 4, implements the present invention.

In implementing this invention, it is apparent that computer executable program code is produced and stored on a computer readable medium from which the program code is deployed to and executed on a computer system. Such a medium is shown in FIG. 7 as a diskette 70. As will be clear from the discussion above, the program code comprises instructions which, when executing on the computer system selectively signals from the computer system the initiation and termination of an interval of non-use of the system by a user; receives at the computer system a selectively sent network communication indicating to a user the desirability of initiating an interval of non-use of the system; and displays to a user an indication that a network communication indicating the desirability of initiating an interval of non-use of the system has been received.

In the drawings and specifications there has been set forth a preferred embodiment of the invention and, although specific terms are used, the description thus given uses terminology in a generic and descriptive sense only and not for purposes of limitation.

What is claimed is:

1. An apparatus comprising: a computer system having a network interface connection and an away button; said away button being responsive to selective activation by a user to signal through said network interface to a system administrator or manager the initiation and termination of an interval of non-use of the system by the user; and said away button being responsive to selective activation by receipt by the user of a network communication from a system administrator or manager through said network interface to signal to the user the desirability of initiating an interval of non-use of the system.

2. The apparatus according to claim 1 wherein said away button is a hardware component.

3. The apparatus according to claim 1 wherein said system further has a display and said away button is an element displayed visibly to a user on said display.

4. The apparatus according to claim 1 wherein said away button signals a user of the desirability of initiating an interval of non-use of the system by a change in state.

5. The apparatus according to claim 4 wherein the change in state is a change in color.

6. The apparatus according to claim 4 wherein the change in state is the initiation of flashing.

7. The apparatus according to claim 6 wherein a change in flash rate is indicative of a degree of urgency attached to the network communication by a system administrator or manager.

8. The apparatus according to claim 1 wherein said computer system is a selected one of a class consisting of a notebook computer system; a desktop computer system; a handheld computer system; and a telephone device.

9. An apparatus comprising: a computer system having an away button and a network interface connection through which said computer system may be linked to a client system, said away button being responsive to selective activation by a user to signal through said network interface connection to a system administrator or manager the initiation and termination of an interval of non-use of the system by the user; and computer readable media accessible to said computer system and storing program code executable on said system; said computer system when executing program code stored on said media receiving a signal initiated via the away button by a user of the client system and indicative of the initiation and termination of an interval of non-use of the client system by the user; and said computer system when executing program code stored on said media originating a network communication through said network interface to signal via the away button to a user of the client system the desirability of a system administrator or manager of initiating an interval of non-use of the client system.

10. A method comprising: selectively signaling from an away button of a computer system, through a network interface connection of the computer system, the initiation and termination of an interval of non-use of the system by a user; receiving through said network interface at the computer system from a system administrator or manager network communication selectively sent by a system administrator or manager indicating to a user the desirability of initiating an interval of non-use of the system; and displaying via the away button to the user an indication from said system administrator or manager indicating the desirability of initiating an interval of non-use of the system has been received through said network interface.

11. The method according to claim 10, wherein said away button is a hardware button, and wherein said signaling of an interval of non-use is generated by user manipulation of the hardware button.

12. The method according to claim 11 wherein said system further has a display and said away button is a software button displayed visibly to a user on said display, and wherein said signaling of an interval of non-use is generated by user selection of a displayed software button.

13. The method according to claim 10 wherein said step of displaying via the away button an indication of the desirability of initiating and interval of non-use signals a user by a change in color.

14. The method according to claim 13 wherein the change in color is indicative of a degree of urgency attached to the network communication.

15. The method according to claim 10, wherein said step of displaying via the away button an indication of the desirability of initiating and interval of non-use signals a user of the desirability by the system administrator or manager of initiating an interval of non-use of the system by a flashing display.

16. The method according to claim 15 wherein a change in flash rate is indicative of a degree of urgency attached to the network communication.

17. A method comprising: producing computer executable program code; storing the produced program code on a computer readable medium; and providing the program code to be deployed to and executed on a computer system having a network interface connection and an away button; the program code comprising instructions which, when executing on the computer system: selectively signals via the away button from the computer system through said network interface the initiation and termination of an interval of non-use of the system by a user; receives at the computer system through said network interface a selectively sent network communication from a system administrator or manager indicating to a user the desirability of initiating an interval of non-use of the system; and displays via the away button to a user an indication that a network communication indicating the desirability of initiating an interval of non-use of the system has been received through said network interface.

18. The method according to claim 17, wherein said away button is a hardware button, and wherein said signaling via the away button of an interval of non-use is generated by user manipulation of the hardware button.

19. The method according to claim 17, wherein said computer system further has a display and said away button is a software button displayed visibly to a user on said display, and wherein said signaling of an interval of non-use is generated by user selection of the displayed software button.

20. The method according to claim 17 wherein said step of displaying via the away button an indication of the desirability of initiating and terminating an interval of non-use signals a user is by a change in color.

21. The method according to claim 17 wherein said step of displaying via the away button an indication of the desirability of initiating and interval of non-use signals a user of the desirability of initiating and terminating an interval of non-use of the system by a flashing display.

\* \* \* \* \*